US007646311B2

(12) United States Patent
Afzulpurkar et al.

(10) Patent No.: US 7,646,311 B2
(45) Date of Patent: Jan. 12, 2010

(54) IMAGE PROCESSING FOR A TRAFFIC CONTROL SYSTEM

(76) Inventors: Nitin Afzulpurkar, Asian Institute of Technology, ISE, School of Engineering and Technology, Klong Luang, Pathumthani (TH) 12120; Huynh Huu Phuong, Asian Institute of Technology, ISE, School of Engineering and Technology, Klong Luang, Pathumthani (TH) 12120

( * ) Notice: Subject to any disclaimer, the term of this patent is extended or adjusted under 35 U.S.C. 154(b) by 339 days.

(21) Appl. No.: 11/837,324

(22) Filed: Aug. 10, 2007

(65) Prior Publication Data

US 2009/0040069 A1   Feb. 12, 2009

(51) Int. Cl.
*G08G 1/07*    (2006.01)
*G08G 1/065*   (2006.01)
*H04N 7/18*    (2006.01)
*G06K 9/00*    (2006.01)
*G06G 7/76*    (2006.01)

(52) U.S. Cl. .................. 340/934; 340/435; 340/909; 340/916; 340/932.2; 348/143; 348/148; 348/149; 382/103; 382/104; 382/105; 701/116; 701/117; 701/118; 701/120

(58) Field of Classification Search .............. 340/435, 340/903, 909, 916, 932.2, 934; 348/143, 348/148–149; 382/103, 104, 199, 235; 701/116–118, 701/120
See application file for complete search history.

(56) References Cited

U.S. PATENT DOCUMENTS

| 4,847,772 | A | * | 7/1989 | Michalopoulos et al. ..... 701/117 |
| 5,402,118 | A | * | 3/1995 | Aoki ............................ 340/937 |
| 5,444,442 | A | * | 8/1995 | Sadakata et al. ............ 340/916 |
| 5,509,082 | A | * | 4/1996 | Toyama et al. .............. 382/104 |
| 6,724,320 | B2 | * | 4/2004 | Basson et al. ............... 340/906 |

* cited by examiner

*Primary Examiner*—Benjamin C Lee
*Assistant Examiner*—Lam P Pham

(57) ABSTRACT

Embodiments of the invention include methods and apparatuses relation to traffic control systems. In one embodiment, a traffic condition is identified by capturing a traffic image, masking the traffic image to obtain an image portion including a traffic image object, and generating the traffic condition based on the traffic image object and the traffic image portion.

25 Claims, 17 Drawing Sheets

| SNEX_time | | WE_density | | |
|---|---|---|---|---|
| | | low | medium | high |
| SN_density | low | medium | medium | very short |
| | medium | long | short | short |
| | high | very long | long | medium |

| WEEX_time | | SN_density | | |
|---|---|---|---|---|
| | | low | medium | high |
| WE_density | low | medium | medium | very short |
| | medium | long | short | short |
| | high | very long | long | medium |

Fig. 16

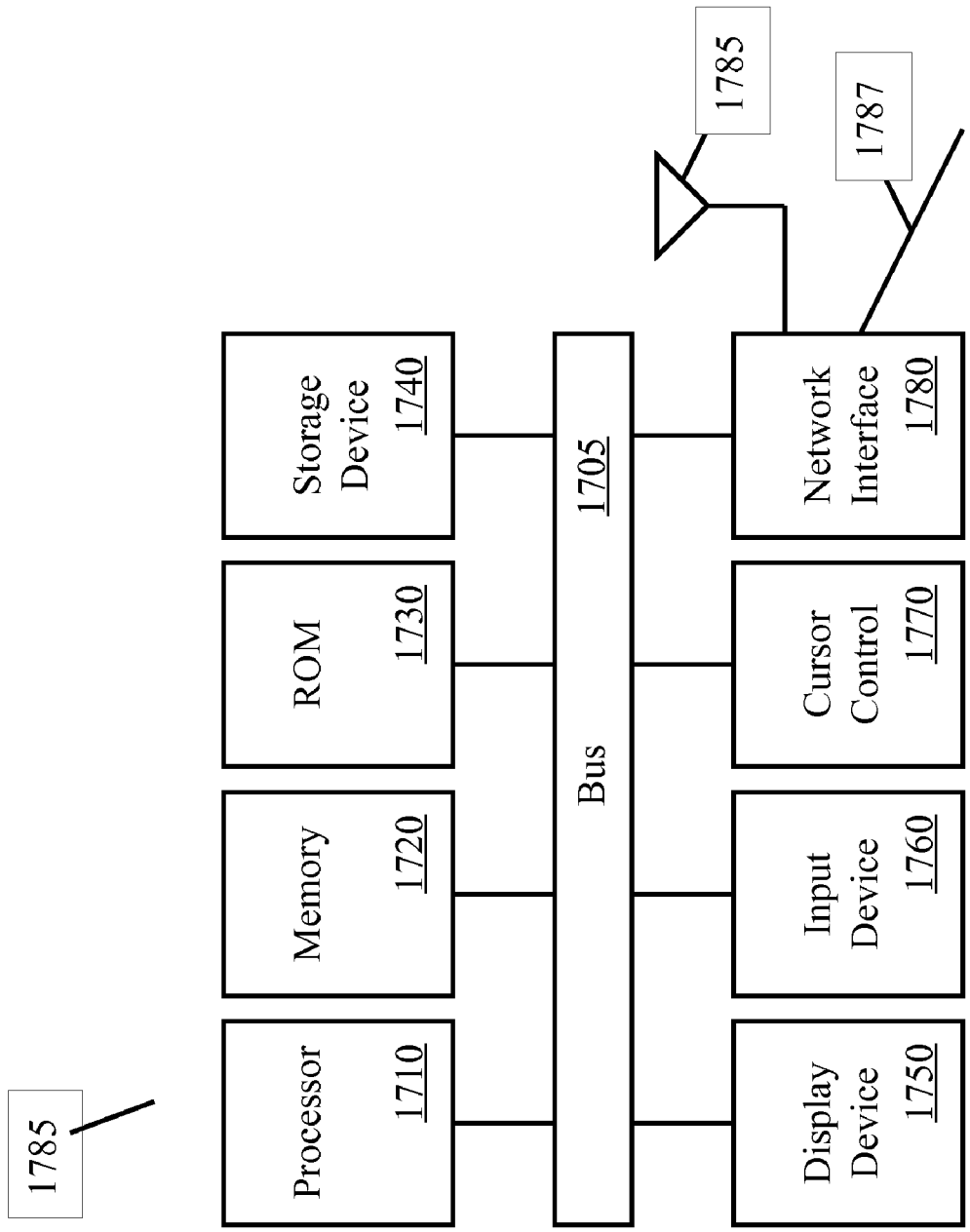

IMAGE PROCESSING FOR A TRAFFIC CONTROL SYSTEM

BACKGROUND

1. Technical Field

The subject matter disclosed herein generally relates to traffic control systems. More specifically, the subject matter relates to image based traffic monitoring and control systems.

2. Information

In traffic control systems, monitoring traffic may be important for the formulation of traffic control strategies. Existing traffic monitoring systems may include underground inductor loops, above ground laser detection, and monitored video camera detection. Each of these systems may offer advantages and disadvantages. Inductor loop detectors may be widespread and reliable, however since they must be buried under the pavement, installation and modification of the system may be cumbersome. Above ground laser detection may offer reliable detection and relatively easy installation, but covering large areas may require numerous detectors, which may translate into unreasonably high costs. Lastly, video camera detection may typically require a human operator, which may increase costs and measurement times.

BRIEF DESCRIPTION OF THE DRAWINGS

Embodiments are illustrated by way of example and not by way of limitation in the figures of the accompanying drawings, in which like references may indicate similar elements and in which:

FIG. 16 illustrates a table of control rules of the traffic lights control process of FIG. 4; and FIG. 17 illustrates a block diagram of an electronic system in accordance with one embodiment.

DETAILED DESCRIPTION

In the following description, various embodiments will be disclosed. However, it will be apparent to those skilled in the art that the embodiments may be practiced with all or only some of the disclosed subject matter. For purposes of explanation, specific numbers and/or configurations are set forth in order to provide a thorough understanding of the embodiments. However, it will also be apparent to one skilled in the art that the embodiments may be practiced without one or more of the specific details, or with other approaches and/or components. In other instances, well-known structures and/or operations are not shown or described in detail to avoid obscuring the embodiments. Furthermore, it is understood that the embodiments shown in the figures are illustrative representations and are not necessarily drawn to scale.

References throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Parts of the description will be presented in terms of operations performed by a computer system, using terms consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system, and the term computer system includes general purpose as well as special purpose data processing machines, systems, and the like, that are standalone, adjunct or embedded.

Various operations will be described as multiple discrete steps in turn, in a manner that is most helpful in understanding the claimed subject matter. However, the order of description should not be construed as to imply that these operations are necessarily order dependent. In particular, these operations need not be performed in the order of presentation.

In various embodiments of the claimed subject matter, an improved method for monitoring and controlling traffic is facilitated. These and other advantages will be evident from the disclosure.

Embodiments of the invention are described hereinafter with reference to FIG. 1 to FIG. 17 of the drawings.

Figure 1:
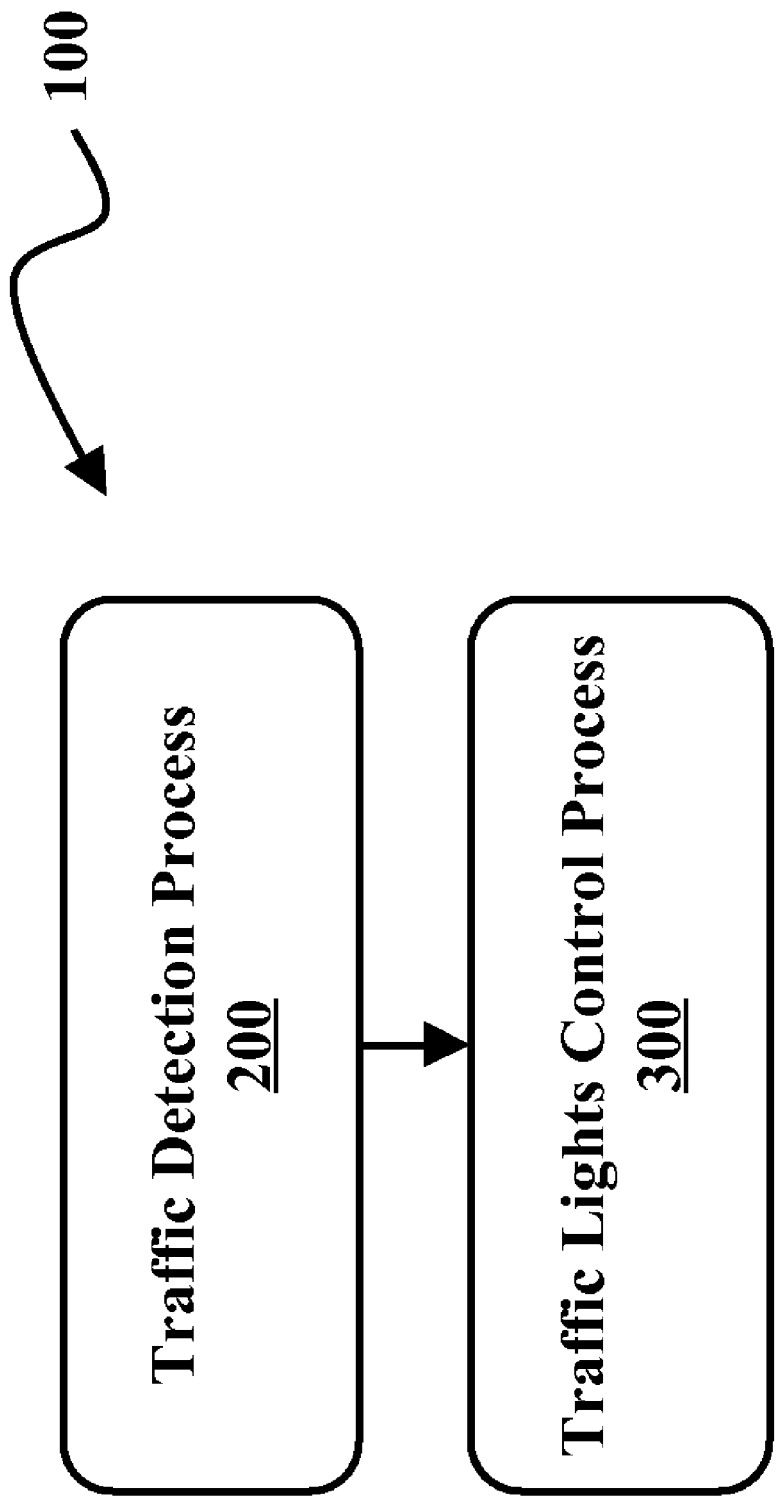
FIG. 1 illustrates a process flow diagram of a traffic monitoring method according to one embodiment.

In FIG. 1, a traffic monitoring method 100 according to one embodiment is illustrated. Traffic monitoring method 100 may include a traffic detection process 200 and a traffic lights control process 300. Traffic detection process 200 and traffic lights control process 300 may be implemented in the same module or hardware, or they may be implemented in separate modules or hardware and communicatively coupled to each other, either by wired or wireless communication. Traffic detection process 200 and traffic lights control process 300 may be further coupled to traffic stations (not shown) or traffic lights (not shown), and control signals (which may include traffic light on or off signals) from either traffic detection process 200 or traffic lights control process 300 may be transmitted to the traffic stations or traffic lights to enable traffic control. Traffic detection process 200 and traffic lights control process 300 are described in further detail with reference to the subsequent figures.

Figure 2:
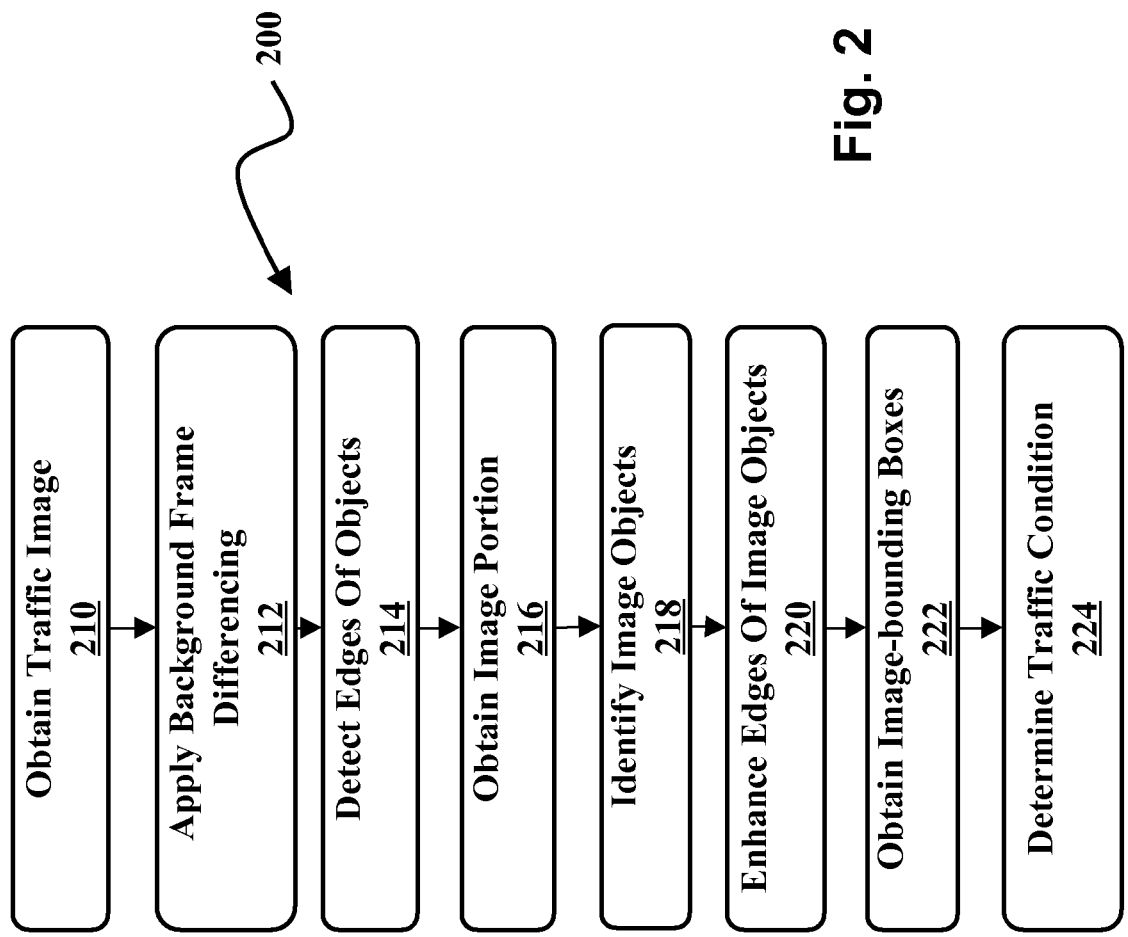
FIG. 2 illustrates a process flow diagram of one embodiment of a traffic detection process as shown in FIG. 1.
Figure 5:
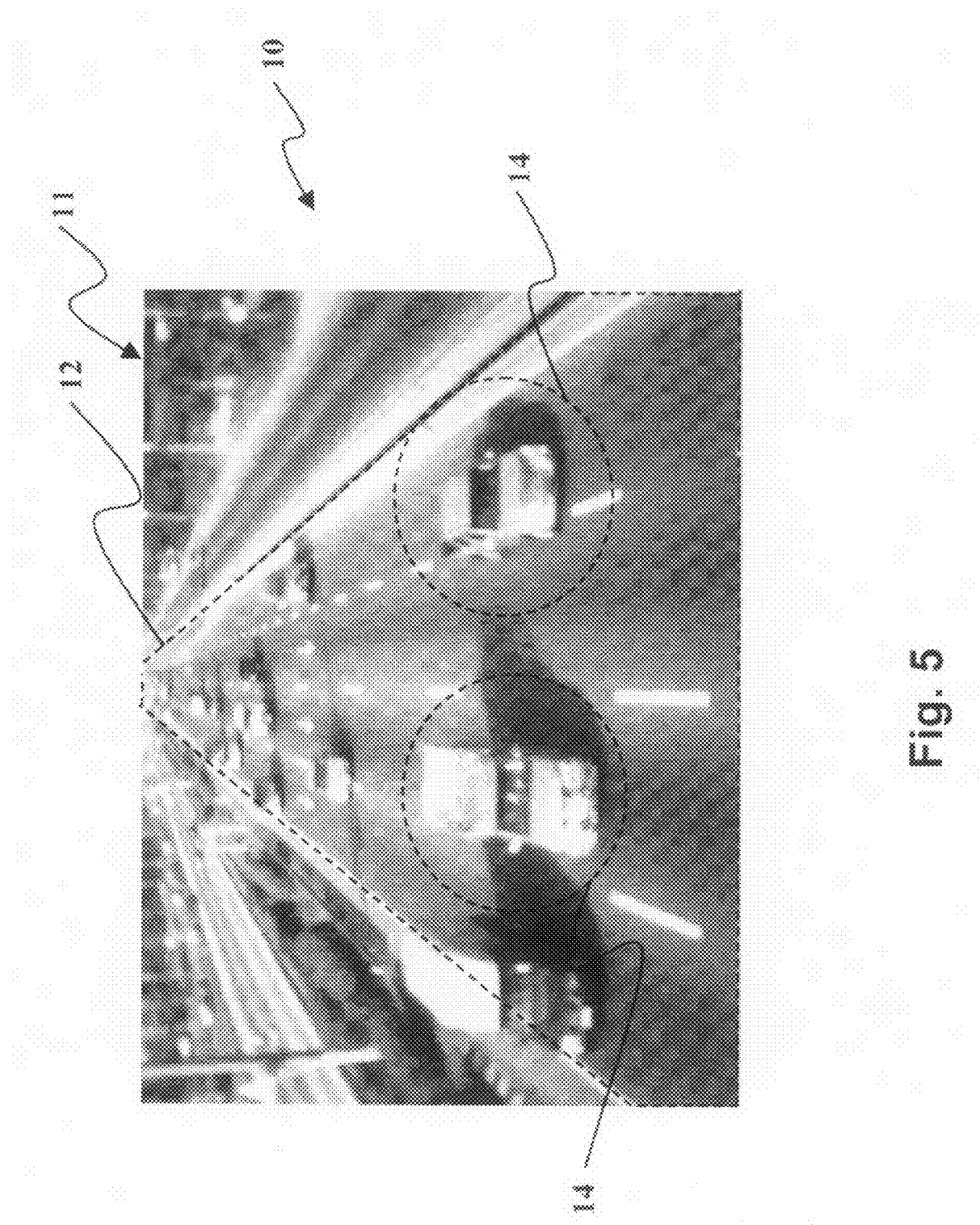
FIG. 5 illustrates an example of a traffic image including a background image, an image portion, and image objects.

FIG. 2 illustrates traffic detection process 200 in accordance with one embodiment. At block 210 of traffic detection process 200, and with reference to FIG. 5, a traffic image 10 may be obtained. As shown in FIG. 5, traffic image 10 may include an image of a traffic location, such as a road, a road intersection, a highway, a highway on-ramp, or the like. Traffic image 10 may include a background image 11, an image portion 12, and image objects 14 within image portion 12. As illustrated in FIG. 5, image objects 14 may be image representation of observed objects, such as, for example, vehicles or pedestrians. As is further shown in FIG. 5, image portion 12 may be an image representation of a region of traffic image 10 having image objects 14. For example, image portion 12 may be a road region whereby monitoring of traffic of the road region is of concern.

Figure 6:
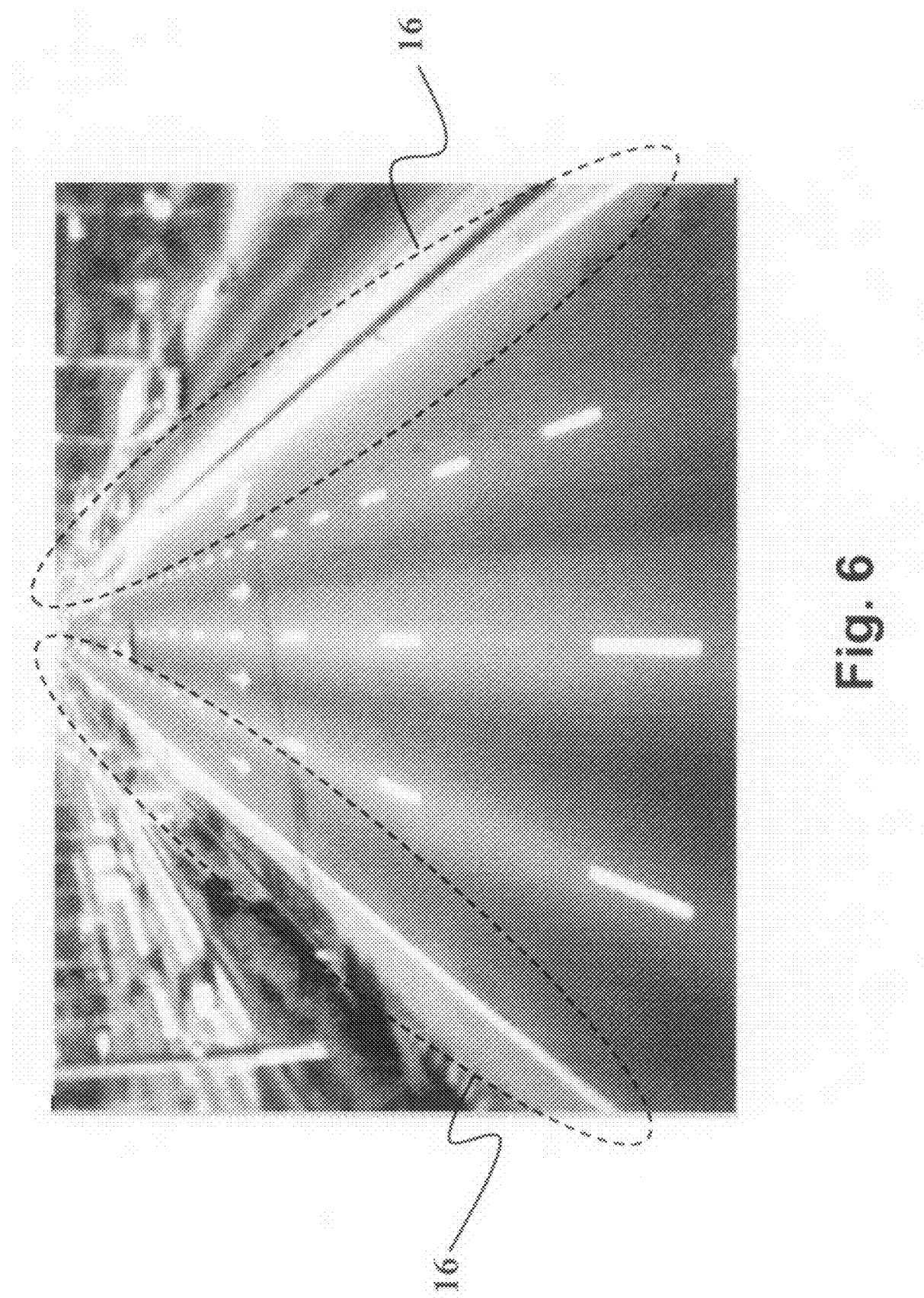
FIG. 6 illustrates road edge markings on the traffic image of FIG. 5.

In general, a traffic image may include any number of image portions that represent regions having image objects that are of interest. For example, the traffic image may be of a single road, an intersection of two or more roads, or multiple roads that do not intersect. In the illustrated example, a traffic image having one image portion of a road is represented for the sake of simplicity. In one example, features of the road region such as road edge markings 16 as illustrated in FIG. 6 may be used to determine the road region of image portion 12, as is further discussed below.

To obtain traffic image 10, a variety of methods may be used. In one example, a remote camera may be used. In one specific example, a remote web-cam may be used to obtain the traffic image. The remote camera may include an interface USB port, an image sensor, and a 6.6 mm lens. The remote camera may be capable of capturing images in Video Graphics Array (VGA) format with resolutions of 640×480 or 320×240 at a refresh rate of about thirty frames per second. Remote cameras and web-cams offer the advantages of being relatively inexpensive and easy to install.

After traffic image 10 is obtained, pre-processing processes including acquiring image frames, converting traffic image 10 from Red Green Blue (RGB) format to grayscale format, median filtering, and adjusting image contrast may be carried out on the obtained traffic image 10. As traffic image 10 may generally have a high noise component as a result of signal interference, median filtering can be used to reduce noise in the traffic image 10. The types of noises may include salt-and-pepper noise and convolutional noise (blurring).

With reference to FIG. 2, at block 212, background frame differencing may be applied to traffic image 10 to differentiate objects found on traffic image 10 from background image 11. Following block 212, boundaries of the objects found on the traffic image 10 may be identified by detecting edges of the objects at block 214. In one example, Sobel edge detection may be used to detect the edges of the objects. Sobel edge detection may be one of many edge detection algorithms conventionally used in image processing. In some examples, if the colors of the objects found on traffic image 10 are very similar to the colors of background image 11, block 214 may be carried out before block 212. In other words, the edges of the objects may first be detected before background frame differencing is applied to the traffic image 10.

Figure 3:
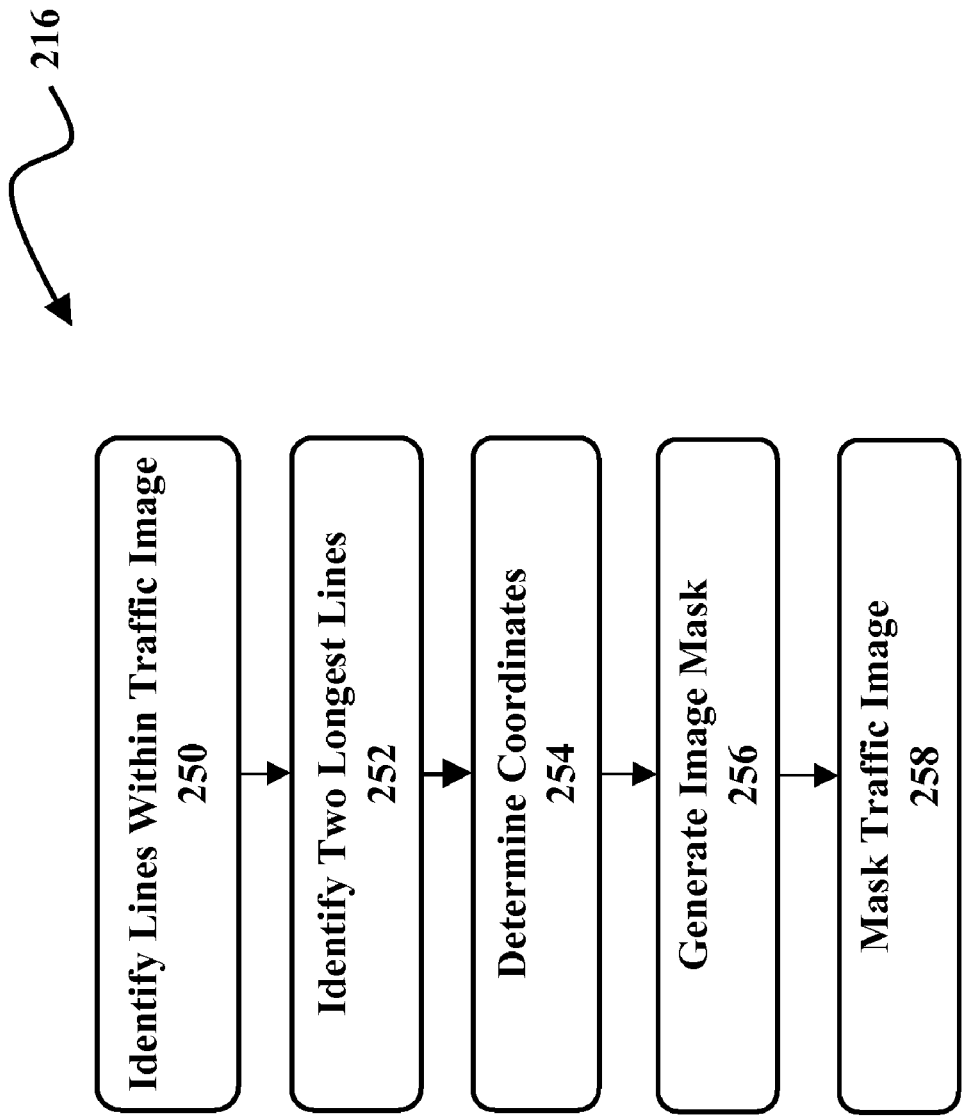
FIG. 3 illustrates a process flow diagram of one embodiment of a method for obtaining an image portion as shown in FIG. 2.
Figure 7:
FIG. 7 illustrates identified lines on the traffic image of FIG. 5.

As shown in FIG. 2, image portion 12 may be obtained at block 216. In some embodiments, multiple image portions may be obtained at block 216. Since image portion 12 may be divided from traffic image 10, block 216 may be described as an image-segmenting block. FIG. 3 illustrates an example of a process flow for obtaining image portion 12. As shown in FIG. 3, block 216 may include a block 250 in which lines 18 within traffic image 10 may be identified, as shown in FIG. 7 (in FIG. 7, only one line is labeled for the sake of clarity). In one example, lines 18 may be identified by applying a Hough transform to traffic image 10. As shown in FIG. 7, a plurality of lines may be identified at block 250.

Figure 8:
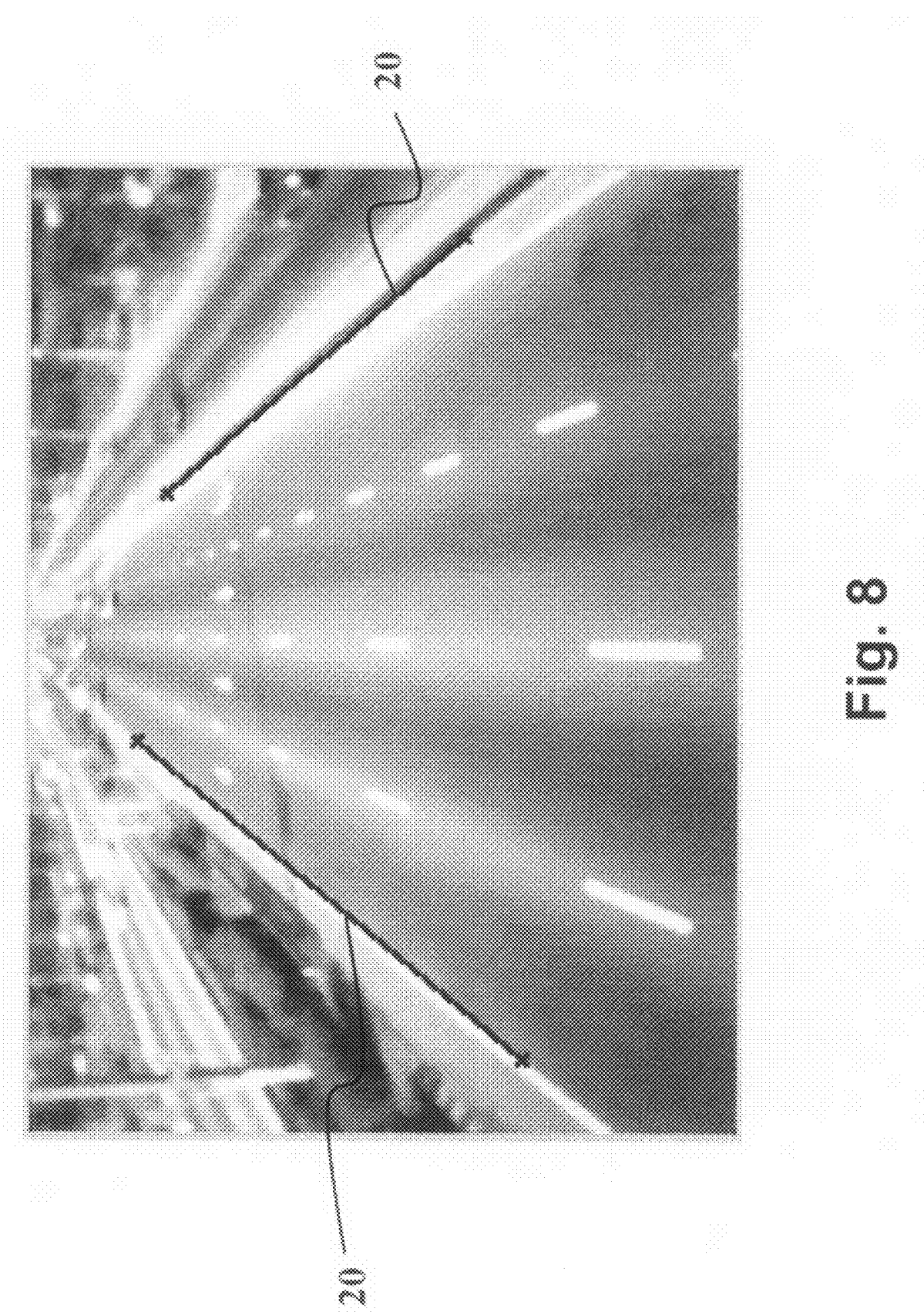
FIG. 8 illustrates the two longest two lines among the identified lines on the traffic image of FIG. 7.

At block 252, the two longest lines obtained at block 250 may be identified. In one example, by pre-defining boundary conditions in relation to lines 18, a pair of extracted lines 20 may be extracted, as is illustrated in FIG. 8. In the illustrated example, the pair of extracted lines 20 may generally represent and extend along diagonal portions of the road region, and allow a perspective coordinate frame (in a perspective view) to be established, as is further discussed below.

Figure 9:
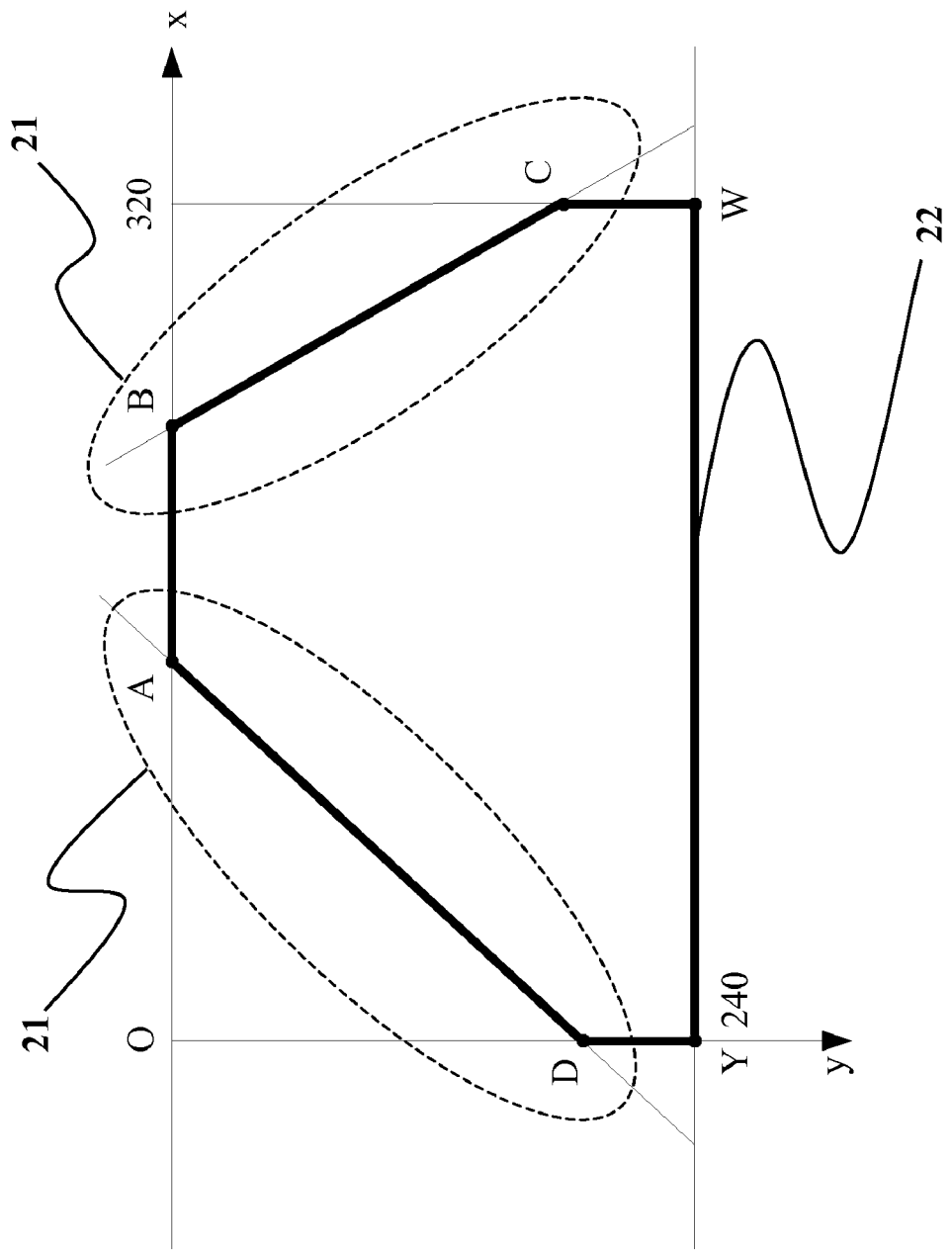
FIG. 9 illustrates a diagram of an example image mask obtained from the traffic detection method of FIG. 2.

The pair of extracted lines 20 may be further extended to intersect with the boundary of traffic image 10 to generate a pair of extended lines 21 as shown in FIG. 9. The illustrated points A, B, C and D may be the points of intersection between the extended lines and the boundary of the traffic image, and the coordinates of the four points may be determined at block 254. In the illustrated example, the coordinates of the four points may substantially define the boundary of the road region. At block 256, an image mask 22, as illustrated by the bolded lines in FIG. 9, may be generated from the coordinates of the four points and a portion of the boundary of the traffic image 10.

The pair of extracted lines 20 and the pair of extended lines 21 may enable image portion 12 to be evaluated so that artifacts such as vehicles or pedestrians on traffic image 10, which are not on the road region, may be eliminated. In other words, traffic image 10 may be masked by the image mask, which may be dimensionally representative of the image portion, at block 258 so that only the road region of image portion 12 may remain. This may result in the filtering of the objects on traffic image 10 leaving only image objects 14 on the road region of image portion 12 to be further evaluated. Image objects 14 may therefore be identified from the image portion 12 at block 218, as illustrated in FIG. 2.

Figure 10:
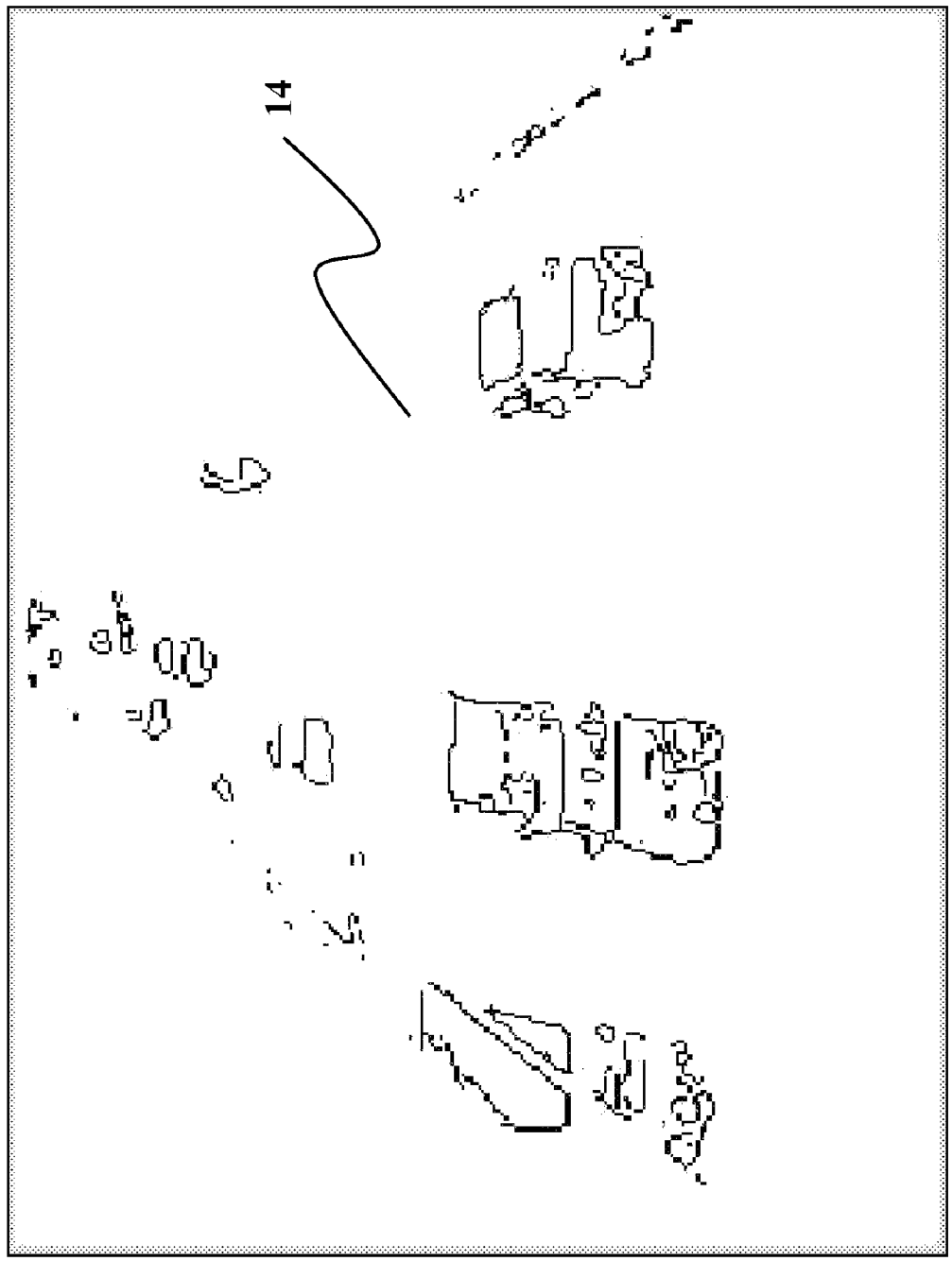
FIG. 10 illustrates a diagram of image objects of the traffic image of FIG. 5.
Figure 11:
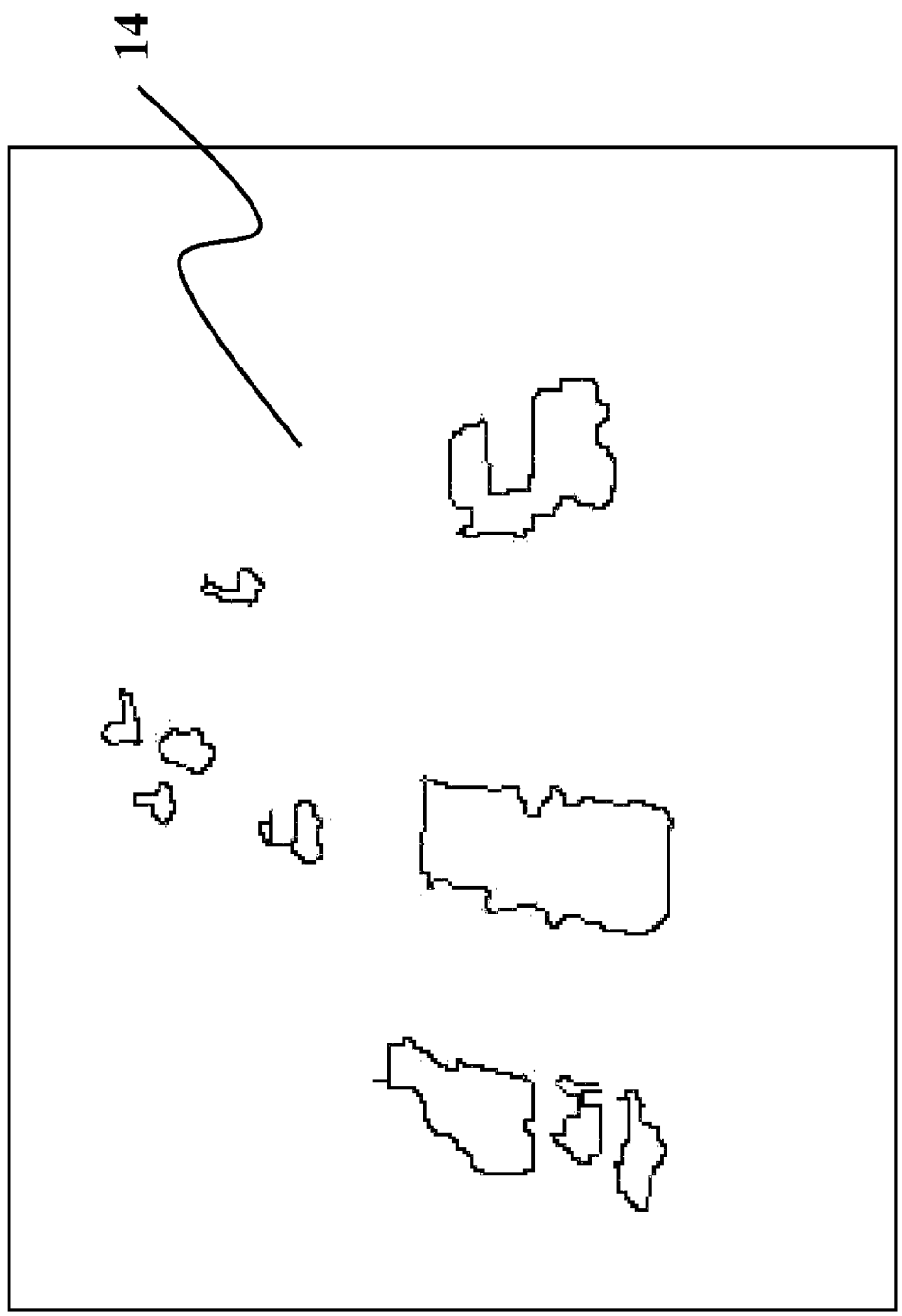
FIG. 11 illustrates a diagram of enhanced edges on the image objects of FIG. 10.

FIG. 10 illustrates an example of the detected edges of image objects 14 on image portion 12 after traffic image 10 has been masked. As shown in FIG. 10, there may be gaps along the edges of image objects 14. An optional block 220 may be carried out to enhance the edges of image objects 14. In one example, the edges may be enhanced by applying morphological functions, and in particular may include a combination of dilation and erosion. An example of enhanced edges of image objects 14 are illustrated in FIG. 11.

Figure 12:
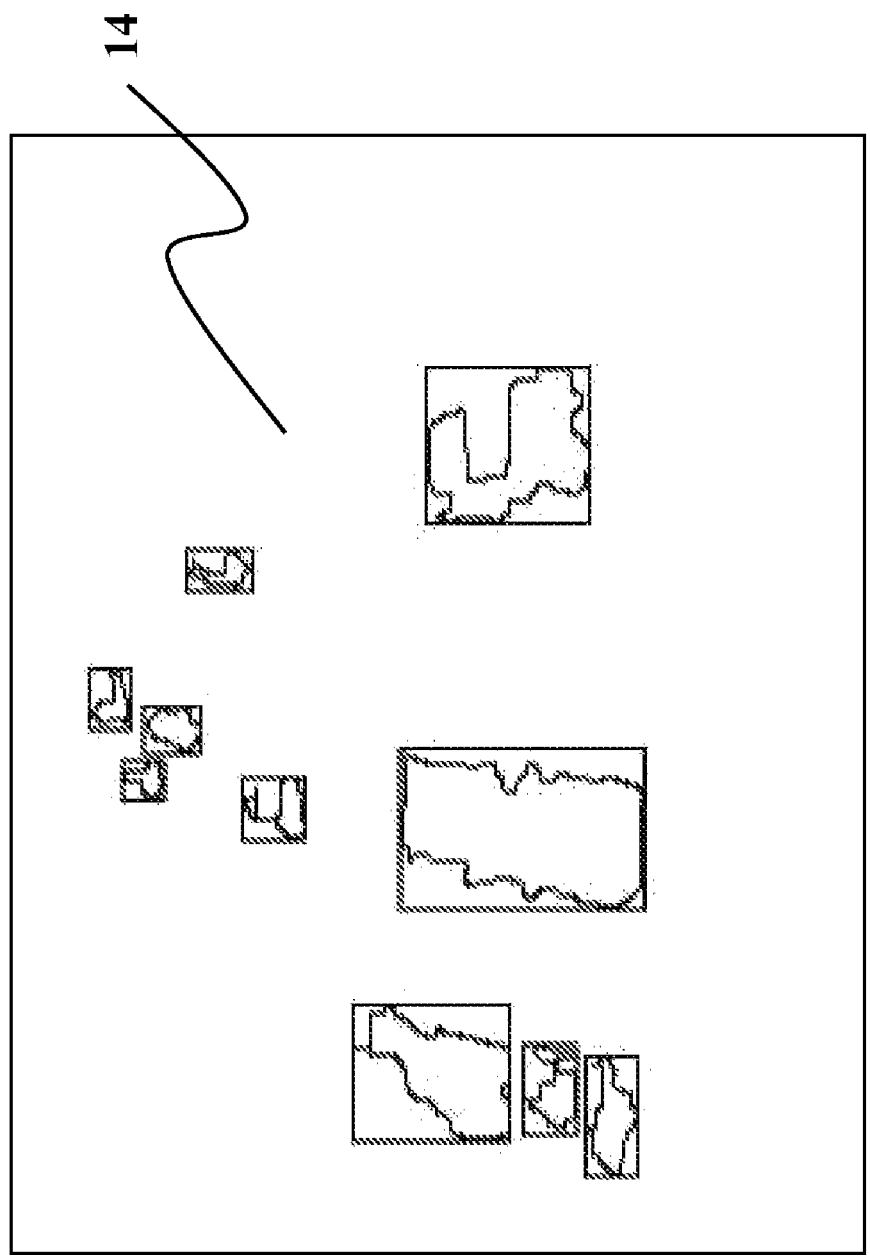
FIG. 12 illustrates a diagram of image-bounding boxes drawn around the enhanced edges of the image objects of FIG. 11.

With reference to FIG. 2, at block 222, image-bounding boxes 24 may be obtained by drawing boxes around the enhanced edges of image objects 14 as illustrated in FIG. 12. As image-bounding boxes 24 may be defined with respect to the perspective coordinate frame, each image-bounding box may be projected to represent an area of a vehicle on the world coordinate frame, as is further discussed below.

With reference to FIG. 2, at block 224, a traffic condition or multiple traffic conditions may be determined. Based at least in part on the traffic image and the evaluated image objects, a variety of traffic conditions that are representative of the image portion may be determined. For example, a total number of image objects may be determined. Further, the locations of the image objects may be determined and the number of image objects within any image portion may be determined. In one embodiment, the traffic density in an image portion may be determined, as is discussed below. Also, as will be apparent in the following discussion, the methods used for determining traffic density may also be utilized to determine a traffic condition of the location of an image object in the world coordinate frame.

The traffic condition or conditions may be embodied in control signals and transferred to traffic stations to control traffic. For example, the traffic conditions may be used to determine traffic light switching either at a traffic station or prior to transmission to a traffic station. The control signals may then control traffic by controlling the switching of traffic lights. The determination of traffic light switching may be based at least in part upon a method using the traffic conditions and predetermined traffic settings. One example of such a method is discussed in further detail below with respect to FIG. 4.

To determine the traffic density, image objects captured in the perspective coordinate frame (based on the perspective of the camera) may be translated to the world coordinate frame (based on the actual position of the image object). The pair of extracted lines 20 may also enable a scaling factor model for image mask 22 of image portion 12 to be established such that the area of the image portion may be determined in the world coordinate frame, as is discussed further below.

The traffic density may be defined as a ratio of the summation of the areas of all the objects, such as vehicles, traveling along the road region to the area of the road region and may be given by the following equation:

$$D = \frac{\sum_{i=1}^{n} S_{Ci}}{S_R} \quad (1)$$

wherein D may be the traffic density, $S_{Ci}$ may be the area (in the world coordinate frame) of the $i^{th}$ object on the road region, $S_R$ may be the area of the road region (in the world coordinate frame) and n may be the number of objects on the road region.

Figure 13:
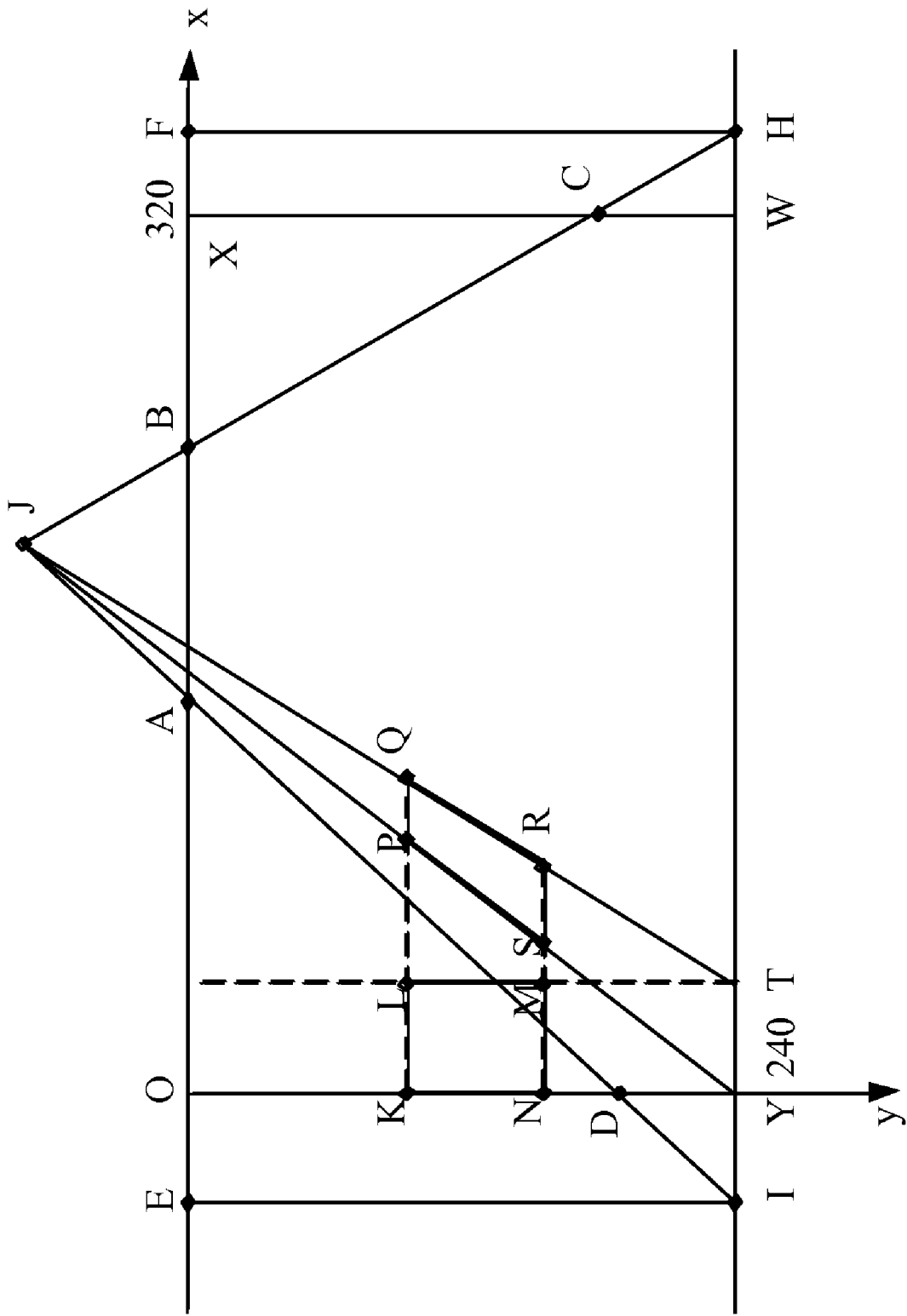
FIG. 13 illustrates a diagram of the projection of an example image-bounding box of FIG. 12 from a perspective coordinate frame to a world coordinate frame.

As illustrated in FIG. 13, an example image bounding box KLMN on the perspective coordinate frame EFHI may be projected onto world coordinate frame ABHI as polygon PQRS, as is described immediately below. Similarly, any image bounding box may be projected onto the world coordinate frame. FIG. 13 and the following discussion illustrates an example using an image resolution of 320×240. As will be appreciated, any image resolution may be used in a manner similar to that described.

In order to understand the projection of KLMN, it may be useful to describe and establish the coordinates of points E, F, H and I of the perspective coordinate frame. In FIG. 13, the area of the image taken by remote camera may be the area between the points O (0,0), X (320,0), Y (0,240), and W (320,240), where the coordinates may be based at least in part upon an x and y coordinate system with its origin in the upper left hand corner of the image, with positive x coordinates extending to the right, and positive y coordinates extending down. As discussed above, the coordinates of points A, B, C and D were previously determined at block 254 of image-segmenting block 216 (please refer to FIG. 9).

The coordinates of points E, F, H and I may be determined based at least in part on points A, B, C, and D, and the boundary points of the image. Line segments AD and BC may be extended to intersect at point J. Line segments AD and BC may also be extended to intersect with the horizontal line extending along the bottom edge of the image, which intersection points are shown as points I and H in FIG. 13. Points E and F may then be the horizontal projections of points A and B at the x coordinates of points I and H. Lines IA and HB may be lines in the world coordinate frame related to lines IE and HF in the perspective coordinate frame. Similarly, the projected line on the world coordinate frame ABHI of any line that is parallel to line IE on the perspective coordinate frame EFHI may share a common intersection point at the point J. For example, line OY on the perspective coordinate frame may be a portion of line JY on the world coordinate frame. Therefore, given the coordinates of the rectangle KLMN on the perspective coordinate frame EFHI based upon the image taken, coordinates of the polygon PQRS on the world coordinate frame ABHI may be determined.

In the following discussion, coordinates in the world coordinate frame for point R may be determined from point M in the perspective coordinate frame. As will be appreciated, the following technique may be used to transfer any point in the perspective coordinate frame to the world coordinate frame. With reference to FIG. 13, the equation of the straight line passing through the points $A(x_A,0)$ and $D(0, y_D)$ may be given by:

$$y = ax + b \quad (2)$$

where $$a = \frac{y_A - y_D}{x_A - x_D} = -\frac{y_D}{x_A}, \text{ and } b = y_D,$$

wherein $y_A=0$ and $x_D=0$.

In addition, continuing the assumption of a resolution of 320×240, the equation of the straight line passing through the points $B(x_B,0)$ and $C(x_C, y_C)$ may be given by:

$$y = cx + d \quad (3)$$

where $$c = \frac{y_C - y_B}{x_C - x_B} = \frac{y_C}{320 - x_B}, \text{ and } d = \frac{y_C x_B}{x_B - x_C} = \frac{y_C x - B}{x_B - 320},$$

wherein $x_C=320$.

The point $J(x_J,y_J)$ may then be obtained by solving equations (2) and (3):

From equation (2):

$$y_J = -\frac{y_D}{x_A}x_J + y_D \quad (4)$$

From equation (3):

$$y_J = \frac{y_C}{320 - x_B}(x_J - x_B) \quad (5)$$

Solving equation (4) and (5):

$$x_J = x_A \frac{y_D(320 - x_B) + y_C x_B}{y_D(320 - x_B) + y_C x_A},$$

and $$y_J = \frac{y_C y_D(x_A - x_B)}{y_C x_A + y_D(320 - x_B)}$$

Then, the point $R(X_M,Y_M)$ on the world coordinate frame ABHI may be the projection of the point $M(x_M,y_M)$ on the perspective coordinate frame EFHI. As the point $R(X_M,Y_M)$ lies on line JT on the world coordinate frame ABHI, from the point M($x_M, y_M$) and point T($x_M$, 240), the equation of the straight line through the line JT may be given by:

$$y = ex + f \qquad (6)$$

where $$e = \frac{y_J - 240}{x_J - x_M},$$

and $$f = \frac{240 x_J - x_M y_J}{x_J - x_M}$$

With reference to equation (6), the relationship between the points R($X_M, Y_M$) and M($x_M, y_M$) may be defined as:

$$X_M = (x_J - x_M) \frac{y_M - f}{y_J - 240},$$

and $$Y_M = y_M$$

Thus, using the above scaling factor model, the coordinates of the points of polygon PQRS on the world coordinate frame may be determined from image-bounding box KLMN. Then, the area of polygon PQRS may be determined using well known methods. Similarly, any image-bounding box may be transformed from the perspective coordinate frame to the world coordinate frame, and the world coordinate frame area may be determined. With reference to equation (1) above, the areas, $S_C$, of all the image objects in the world coordinate frame may then be summed.

Again with reference to equation (1), the area of the road region $S_R$ may be determined from image mask 22 using the points A, B, C and D using well known methods. Consequently, the traffic density may be calculated by using equation (1). The above described methods may be used to determine the traffic density of any image portion of a traffic image. Although an example of a roadway extending away from the camera perspective is illustrated, the roadway may extend horizontally across the camera perspective, or diagonally across the camera perspective.

Figure 4:
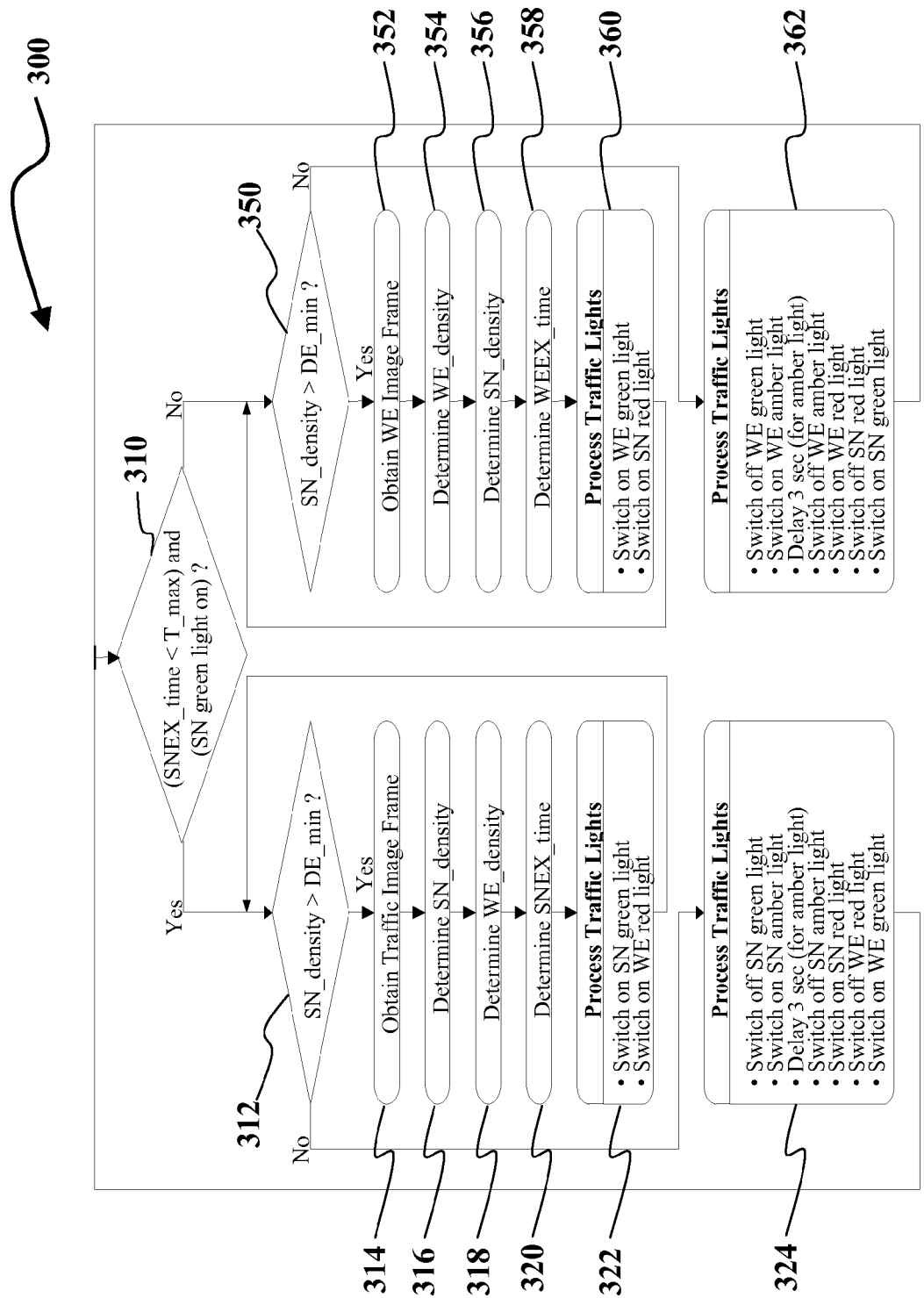
FIG. 4 illustrates a process flow diagram of one embodiment of a traffic lights control process as shown in FIG. 1.
Figure 14:
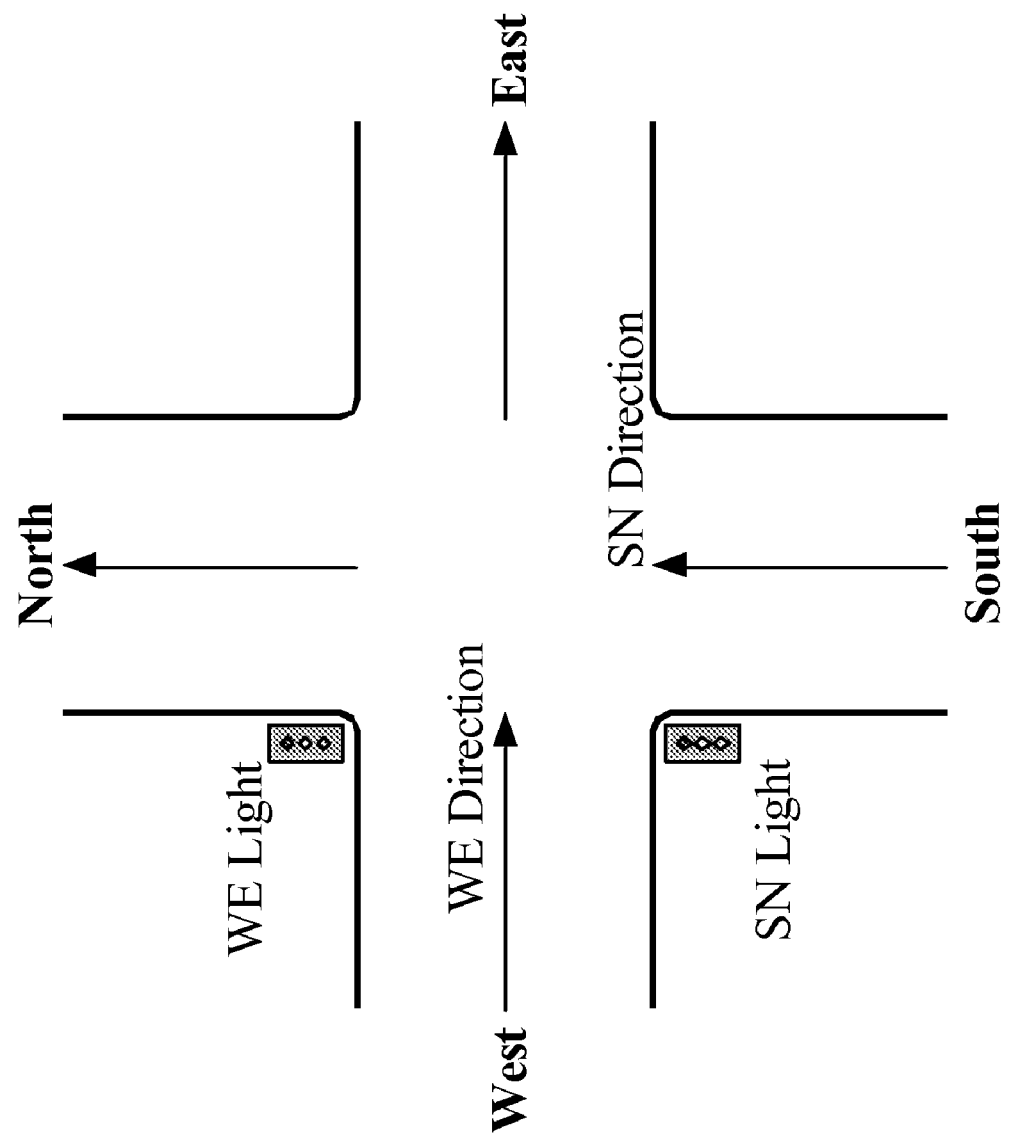
FIG. 14 illustrates an example intersection model used to illustrate the example algorithm for the traffic lights control process of FIG. 4.

With reference to FIG. 1, one embodiment of traffic lights control process 300 of traffic monitoring method 100 is illustrated in FIG. 4. In the illustrated example, an intersection model may be assumed as shown in FIG. 14. However, the methods described may be extended to a variety of other traffic models including two-way intersections or intersections of multiple roadways. The intersection model of FIG. 14 may include two traffic directions with each direction having one lane. The first direction may be from South to North (SN) and the second direction may be from West to East (WE). The respective corresponding traffic densities may be designated as SN_density and WE_density.

In the model, there may be two input variables (SN_density and WE_density) and an output variable (EX_time). EX_time may represent the duration the green light of a set of traffic lights (green, amber, red) remains switched on (EX_time for the SN direction may be labeled SNEX_time, similarly for the WE direction EX_time may be labeled WEEX_time). Based at least in part on the traffic density values determined from the traffic detection process 200 as described above, control rules for EX_time may be established, as shown in FIG. 16. Using the table, for a given SN_density and WE_density, an EX_time (either SNEX_time or WEEX_time) may be determined. For example, if SN_density is low and WE_density is low, then SNEX_time may be medium. In another example, if SN_density is low and WE_density is medium, then SNEX_time is short. The densities and time duration associated with the terms "very short", "short", "medium", "long", and "very long" may be predetermined and established based at least in part on the traffic model that is being monitored and controlled.

Figure 15:
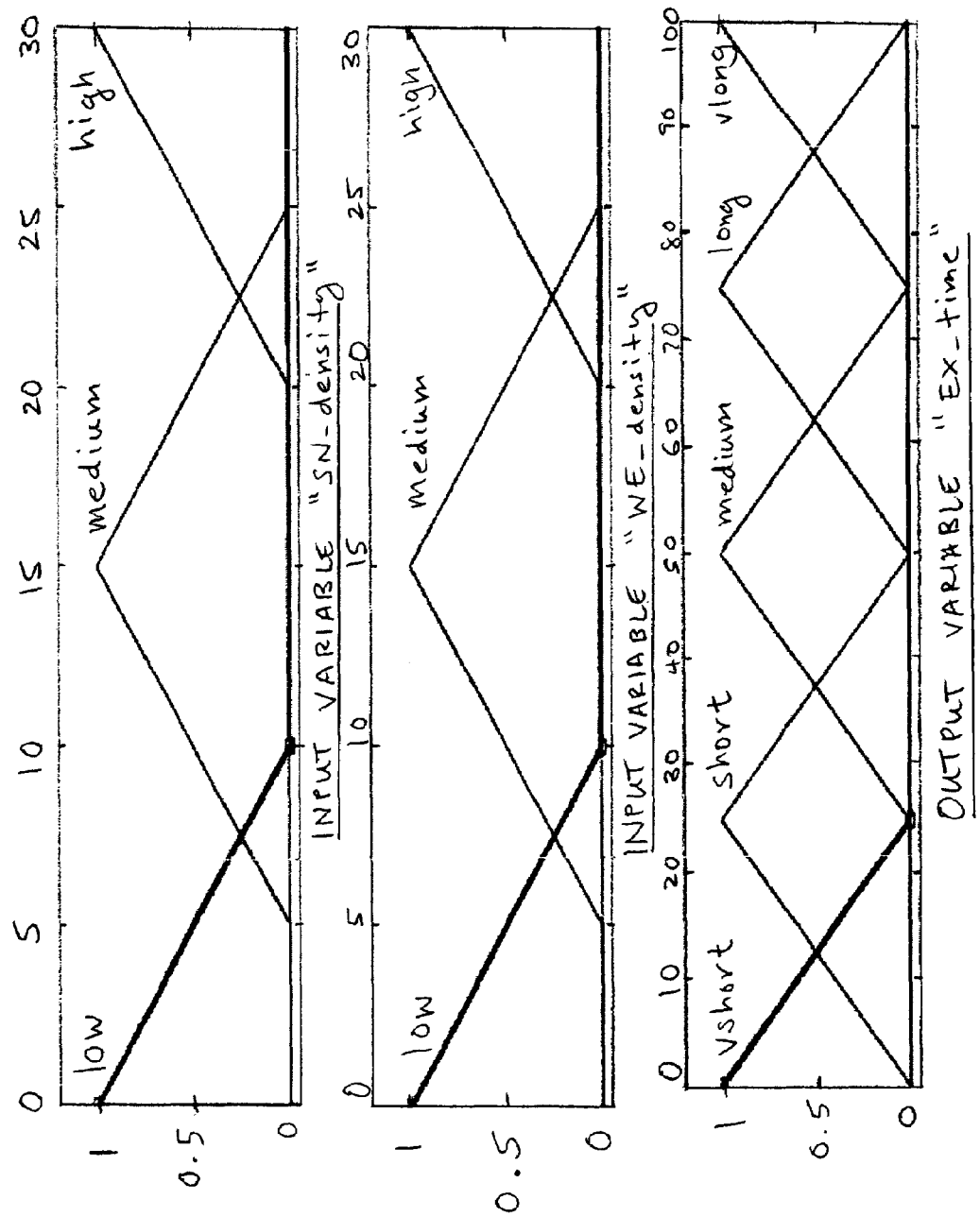
FIG. 15 illustrates membership functions of variables obtained from the traffic detection method of FIG. 2.

Based at least in part on the traffic density values determined from the traffic detection method 200, membership functions are preferably applied for correlating the variables as shown in FIG. 15.

FIG. 4 illustrates a flow diagram of one embodiment of a traffic lights control process 300. Starting at the top of FIG. 4, a course of action to take may be determined at block 310, based at least in part on whether SNEX_time is smaller or greater than T_max (the maximum duration that the green light may remained switched on) and whether the SN green light is switched on. If SNEX_time is less than T_max and the SN green light is on, the result of block 310 may be "Yes" and the flow diagram may continue to the left column of blocks, beginning at block 312. If not, the result may be "No" and the flow diagram may continue to the right column of blocks, beginning at block 350.

If the result was "Yes" at block 310, SN_density may be compared to DE_min at block 312. If SN_density is greater than DE_min, the result of block 312 may be "Yes" and the next block may be block 314. If not, the result may be "No" and the next block may be 324. If the result was "No" at block 312, the traffic light may be processed at block 324 (for example: SN green light may be switched off, SN amber light may be switched on, there may be a 3 second delay, SN amber may be switched off, SN red light may be switched on, WE red light may be switched off, and WE green light may be switched on). That is, if the traffic density at the SN green light is below a predetermined density, the SN light may change from green to red and the WE light may change from red to green. After processing the traffic lights, the process flow may return to block 310, and the discussed flow may be continued.

However, if the result at block 312 was "Yes" (the SN density being greater than a predetermined minimum), blocks 314, 316, 318, 320 and 322 may be followed before again comparing, at block 312, SN_density to DE_min. At block 314, an SN image frame may be obtained, and at blocks 316 and 318, SN_density and WE_density may be determined. The methods previously described may be used to determine the traffic densities. At block 320, SNEX_time may be determined, for example by using pre-determined values and the table shown in FIG. 16. At block 322, the SN green light and the WE red light may remain switched on. After block 322, the process flow returns to block 312 for a comparison of SN_density and DE_min.

From block 310, if the result was "No" (SNEX_time is greater than T_max or the SN light is not switched on), the flow diagram may proceed to block 350. At block 350, if WE_density is greater than DE_min, the result of block 350 may be "Yes" and the next block may be block 352. If not, the result may be "No" and the next block may be 352. If the result was "No" at block 350, the traffic light may be processed at block 362 (for example: WE green light may be switched off, WE amber light may be switched on, there may be a 3 second delay, WE amber light may be switched off, WE red light may be switched on, SN red light may be switched off, and SN green light may be switched on). That is, if the traffic density at the WE green light is below a predetermined density, the WE light may change from green to red and the SN light may change from red to green. After processing the traffic lights, the process flow may return to block 310.

However, if the result at block 350 was "Yes" (the WE density being greater than a predetermined minimum), blocks 352, 354, 356, 358, and 360, may be followed before again comparing, at block 350, WE_density to DE_min. At block 352, a WE image frame may be obtained, and at blocks 354 and 356, WE_density and SN_density may be determined. At block 358, WEEX_time may be determined. At block 360, the SN green light and the WE red light may remain switched on. After block 360, the process flow may return to block 350 for a comparison of WE_density and DE_min.

In some embodiments, the above described techniques may be implemented as sequences of instructions executed by an electronic system or machine. The sequences of instructions may be stored by the electronic device or the instructions can be received by the electronic device (e.g., via a network connection).

FIG. 17 is a block diagram of an electronic system according to one embodiment. The electronic system illustrated in FIG. 17 is intended to represent a range of electronic systems, for example, computer systems, network access devices, etc. Alternative systems, whether electronic or non-electronic, can include more, fewer, or different components. Certain embodiments may include additional components, may not require all of the illustrated components, or may combine one or more of the illustrated components. For example, the described memory may be on chip with the described processor.

Electronic system 1700 may include a bus 1705 or other communication device to communicate information, and processor 1710 coupled to bus 1705 to process information. Bus 1705 may include a bus bridge, an I/O (Input/Output) Bus, and/or a high speed bus. While electronic system 1700 is illustrated with a single processor, electronic system 1700 may include multiple processors or co-processors. Electronic system 1700 may further include random access memory (RAM) or other dynamic storage device 1720 (referred to as memory), coupled to bus 1705 to store information and instructions to be executed by processor 1710. Memory 1720 also can be used to store temporary variables or other intermediate information during execution of instructions by processor 1710.

Electronic system 1700 may also include read only memory (ROM) and/or other static storage device 1730 coupled to bus 1705 to store static information and instructions for processor 1710. Further, data storage device 1740 may be coupled to bus 1705 to store information and instructions. Data storage device 1740 such as a magnetic disk or optical disc and corresponding drive can be coupled to electronic system 1700.

Electronic system 1700 may also have coupled to bus 1705 a display device 1750, such as a cathode ray tube (CRT) or liquid crystal display (LCD), to display information to a user. Input device 1760, including alphanumeric and other keys, may be typically coupled to bus 1705 to communicate information and command selections to processor 1710. Another type of user input device may be cursor control 1770, such as a mouse, a trackball, or cursor direction keys to communicate direction information and command selections to processor 1710 and to control cursor movement on display 1750. Electronic system 1700 may further include a network interface 1780, such as, but not limited to, a wired network interface 1787 or a wireless network interface 1785 to provide access to a network, such as a local area network.

Instructions may be provided to memory or the processor by any machine readable medium. An electronically-accessible or machine readable medium includes any mechanism that provides (i.e., stores and/or transmits) content (e.g., computer executable instructions) in a form that may be readable by an electronic device (e.g., a computer, a server, a personal digital assistant, a cellular telephone). In various examples, the machine readable instructions may be provided in a machine readable medium such as from a storage device (such as magnetic disk or optical storage media), a read-only memory (ROM), random access memory (RAM), Flash memory, CD-ROM, DVD, via a remote connection (e.g., over a wired or wireless network via network interface such as by a propagated signal: carrier waves, infrared signals, digital signals, etc.) providing access to one or more electronically-accessible media, etc. In alternative embodiments, hard-wired circuitry or firmware can be used in place of or in combination with software instructions. For example, one or more application specific integrated circuits (ASICs) may be programmed with one or more of the described functions. In another example, one or more programmable grid arrays (PGAs) may be used to implement one or more of the functions of the described subject matter. Thus, execution of sequences of instructions is not limited to any specific combination of hardware circuitry and software instructions.

While there has been illustrated and/or described what are presently considered to be example embodiments of claimed subject matter, it will be understood by those skilled in the art that various other modifications may be made, and/or equivalents may be substituted, without departing from the true scope of claimed subject matter. Additionally, many modifications may be made to adapt a particular situation to the teachings of claimed subject matter without departing form subject matter that is claimed. Therefore, it is intended that the patent not be limited to the particular embodiments disclosed, but that it covers all embodiments falling within the scope of the appended claims.

What is claimed is:

1. A vehicular traffic monitoring method comprising:
   obtaining an image of a traffic location, the image of the traffic location including an image portion;
   generating an image mask, the image mask being dimensionally representative of the image portion;
   masking the image of the traffic location using the image mask to obtain the image portion, the image portion including at least one vehicular image object;
   identifying the at least one vehicular image object from the image portion; and
   determining a traffic density representative of the image portion based at least in part on the at least one vehicular image object by:
   detecting an edge of the at least one vehicular image object;
   drawing an image-bounding box around the edge of the at least one vehicular image object;
   translating the image-bounding box from a perspective coordinate frame to a world coordinate frame;
   determining an area of the image-bounding box in the world coordinate frame;
   determining an area of the image portion in the world coordinate frame; and
   determining the traffic density as a ratio of the area of the image-bounding box in the world coordinate frame to the area of the image portion in the world coordinate frame.

2. The traffic monitoring method of claim 1, further comprising:
enhancing the edge of the image object by applying a morphological function.

3. The traffic monitoring method of claim 1, further comprising:
determining a second traffic density for a second image portion of the image of the traffic location; and
determining a duration for a green traffic light based at least in part upon the traffic density and the second traffic density.

4. The traffic monitoring method of claim 3, further comprising:
comparing the duration for the green traffic light to a maximum green light duration; and
if the duration for the green traffic light is less than the maximum green light duration, then comparing the traffic density to a minimum traffic density; and
if the traffic density is less than the minimum traffic density, then switching the green traffic light off.

5. The traffic monitoring method of claim 4, further comprising:
if the traffic density is greater than the minimum traffic density, then obtaining a second image of the traffic location.

6. The traffic monitoring method of claim 1, wherein obtaining the image of the traffic location comprises obtaining the image of the traffic location from a remote camera.

7. The traffic monitoring method of claim 1, further comprising:
generating control signals for transmission to a traffic station for enabling traffic control.

8. The traffic monitoring method of claim 1, wherein generating the image mask comprises:
identifying a plurality of lines within the traffic image;
identifying a first line and a second line from the plurality of lines, the first line and the second line being the two longest of the plurality of lines; and
defining the image mask between the first line, the second line, and a portion of a boundary of the traffic image.

9. The traffic monitoring method of claim 8, wherein identifying the plurality of lines comprises a Hough transform.

10. A machine readable medium having stored therein a plurality of instructions that, when executed, cause the machine to monitor vehicular traffic by:
receiving an image of a traffic location, the image of the traffic location including an image portion;
generating an image mask, the image mask being dimensionally representative of the image portion;
masking the image of the traffic location using the image mask to obtain the image portion, the image portion including at least one vehicular image object;
identifying the at least one vehicular image object from the image portion; and
determining a traffic density representative of the image portion based at least in part on the at least one vehicular image object by:
detecting an edge of the at least one vehicular image object;
generating an image-bounding box around the edge of the at least one vehicular image object;
translating the image-bounding box from a perspective coordinate frame to a world coordinate frame;
determining an area of the image-bounding box in the world coordinate frame;
determining an area of the image portion in the world coordinate frame; and
determining the traffic density as a ratio of the area of the image-bounding box in the world coordinate frame to the area of the image portion in the world coordinate frame.

11. The machine readable medium of claim 10, further comprising instructions that, when executed, cause the machine to monitor vehicular traffic by:
enhancing the edge of the image object by applying a morphological function.

12. The machine readable medium of claim 10, further comprising instructions that, when executed, cause the machine to monitor vehicular traffic by:
determining a second traffic density for a second image portion of the image of the traffic location; and
determining a duration for a green traffic light based at least in part upon the traffic density and the second traffic density.

13. The machine readable medium of claim 12, further comprising instructions that, when executed, cause the machine to monitor vehicular traffic by:
comparing the duration for the green traffic light to a maximum green light duration; and
if the duration for the green traffic light is less than the maximum green light duration, then comparing the traffic density to a minimum traffic density; and
if the traffic density is less than the minimum traffic density, then generating a green traffic light off signal.

14. The machine readable medium of claim 13, further comprising instructions that, when executed, cause the machine to monitor vehicular traffic by:
if the traffic density is greater than the minimum traffic density, then receiving a second image of the traffic location.

15. The machine readable medium of claim 10, further comprising instructions that, when executed, cause the machine to monitor vehicular traffic by:
generating control signals for transmission to a traffic station for enabling traffic control.

16. The machine readable medium of claim 10, wherein generating the image mask comprises:
identifying a plurality of lines within the traffic image;
identifying a first line and a second line from the plurality of lines, the first line and the second line being the two longest of the plurality of lines; and
defining the image mask between the first line and the second line, and a portion of a boundary of the traffic image.

17. The machine readable medium of claim 16, wherein identifying the plurality of lines comprises a Hough transform.

18. An apparatus comprising:
a machine readable medium having stored therein a plurality of programming instructions that, when executed, cause the apparatus to monitor vehicular traffic by:
receiving an image of a traffic location, the image of the traffic location including an image portion;
generating an image mask, the image mask being dimensionally representative of the image portion;
masking the image of the traffic location using the image mask to obtain the image portion, the image portion including at least one vehicular image object;
identifying the at least one vehicular image object from the image portion; and
determining a traffic density representative of the image portion based at least in part on the at least one vehicular image object by:
detecting an edge of the at least one vehicular image object;

generating an image-bounding box around the edge of the at least one vehicular image object;

translating the image-bounding box from a perspective coordinate frame to a world coordinate frame;

determining an area of the image-bounding box in the world coordinate frame;

determining an area of the image portion in the world coordinate frame; and determining the traffic density as a ratio of the area of the image-bounding box in the world coordinate frame to the area of the image portion in the world coordinate frame; and a processor coupled to the machine readable medium to execute the programming instructions.

19. The machine readable medium of claim 18, further comprising instructions that, when executed, cause the apparatus to monitor vehicular traffic by:

enhancing the edge of the at least one vehicular image object by applying a morphological function.

20. The machine readable medium of claim 18, further comprising instructions that, when executed, cause the apparatus to monitor vehicular traffic by:

determining a second traffic density for a second image portion of the image of the traffic location; and determining a duration for a green traffic light based at least in part upon the traffic density and the second traffic density.

21. The machine readable medium of claim 20, further comprising instructions that, when executed, cause the apparatus to monitor vehicular traffic by:

comparing the duration for the green traffic light to a maximum green light duration; and if the duration for the green traffic light is less than the maximum green light duration, then comparing the traffic density to a minimum traffic density; and if the traffic density is less than the minimum traffic density, then generating a green traffic light off signal.

22. The machine readable medium of claim 21, further comprising instructions that, when executed, cause the apparatus to monitor vehicular traffic by:

if the traffic density is greater than the minimum traffic density, then obtaining a second image of the traffic location.

23. The machine readable medium of claim 18, further comprising instructions that, when executed, cause the apparatus to monitor vehicular traffic by:

generating control signals for transmission to a traffic station for enabling traffic control.

24. The machine readable medium of claim 18, wherein generating the image mask comprises:

identifying a plurality of lines within the traffic image;

identifying a first line and a second line from the plurality of lines, the first line and the second line being the two longest of the plurality of lines; and defining the image mask between the first line and the second line, and a portion of a boundary of the traffic image.

25. The machine readable medium of claim 24, wherein identifying the plurality of lines comprises of Hough transform.

* * * * *